Oct. 17, 1933.  M. J-B. BARBAROU  1,930,548
PROPELLER WITH VARIABLE PITCH

Original Filed March 1, 1930   2 Sheets-Sheet 1

Marius Jean-Baptiste-Barbarou
INVENTOR;
By  
his Attorney.

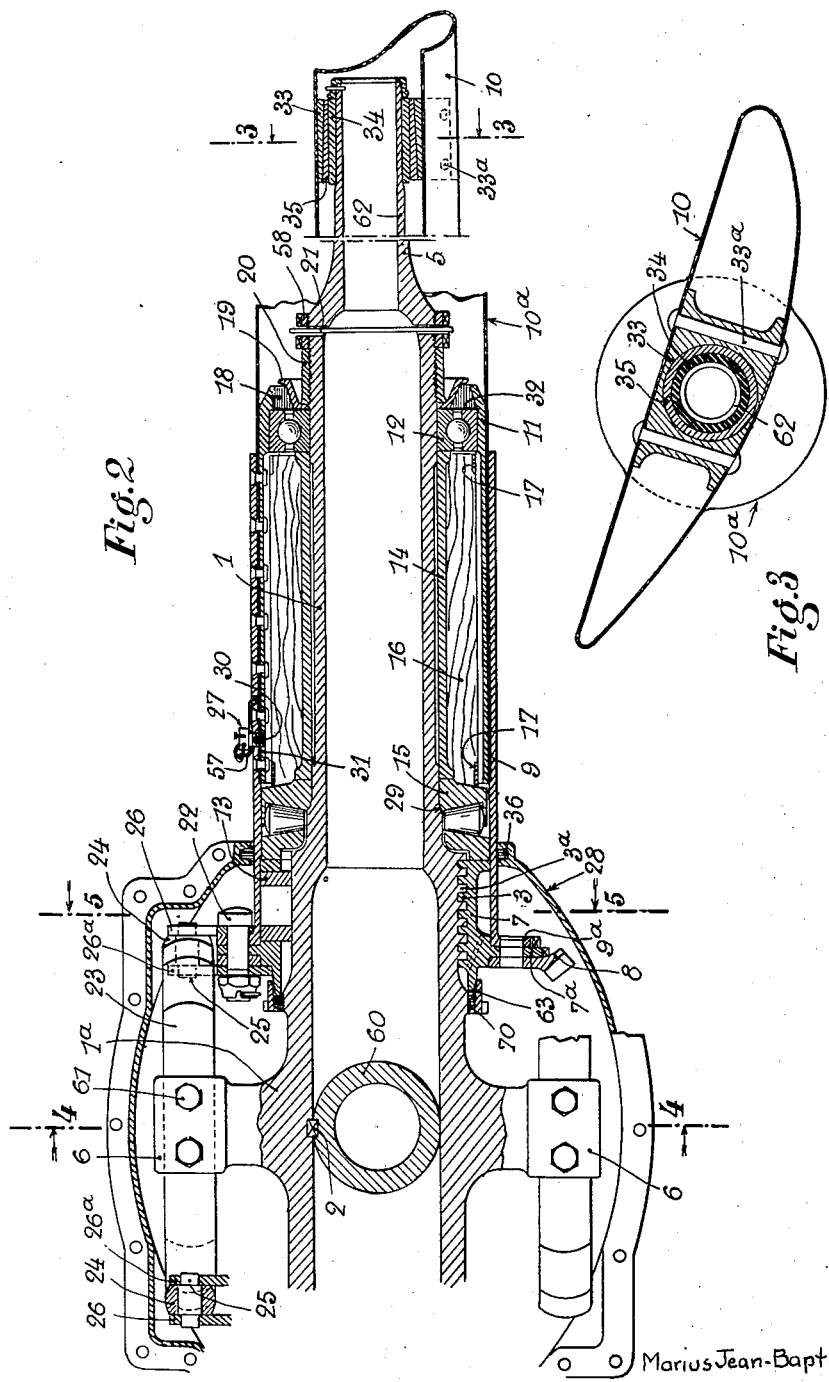

Patented Oct. 17, 1933

1,930,548

UNITED STATES PATENT OFFICE 1,930,548

PROPELLER WITH VARIABLE PITCH

Marius Jean-Baptiste Barbarou, Neuilly-sur-Seine, France

Original application March 1, 1930, Serial No. 432,449, and in France March 19, 1929. Divided and this application April 1, 1931. Serial No. 526,794

1 Claim. (Cl. 170—162)

The present application is a division from Patent No. 1,825,768, October 6, 1931, filed March 1, 1930, which has for its object to provide a propeller unit in which the pitch of the propeller varies automatically with the altitude. Patent 1,825,768 chiefly relates to the means for automatically actuating the propeller blades. The present invention relates to an arrangement of the propeller blades upon their support which allows the oscillations of said blades.

One object of the invention is to secure an improved mounting of the propeller blades upon their supporting arm to prevent deformation of the propeller blades.

Another object of the invention is to provide a vibration damping connection between the propeller blades and their supporting arms.

A further object of the invention is to devise improved means for taking up the thrust of the blades due to centrifugal force.

The invention will be disclosed with reference to the accompanying drawings, which are given by way of example, and in which:

Fig. 2 is a partial axial section of the main propeller of which only one blade is shown, the section being made on the line 2—2 of Fig. 4.

Fig. 3 is a cross section, on the line 3—3 of Fig. 2 of a main propeller blade.

Figure 1:
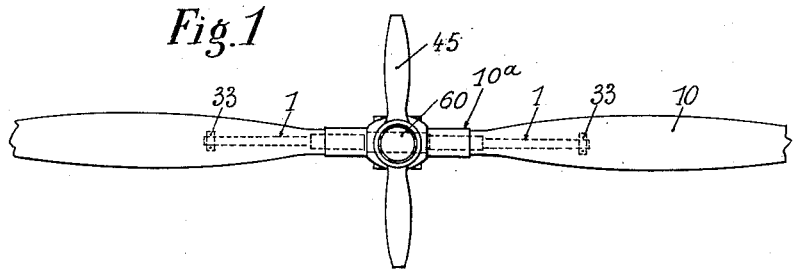
Fig. 1 is a diagrammatic view of the propeller unit according to the invention.
Figure 4:
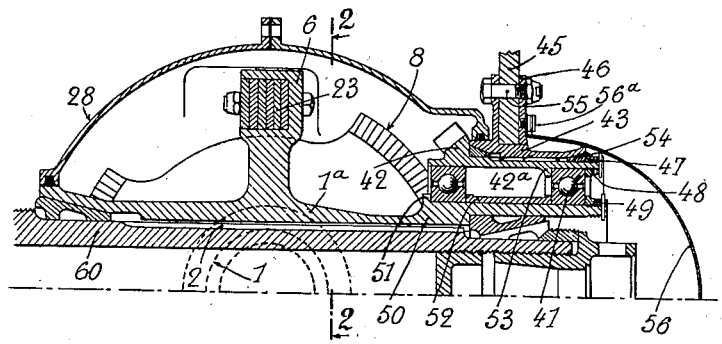
Fig. 4 is a cross section, on the line 4—4 of Fig. 2.

As shown in Figs. 1 and 4, 45 is an auxiliary propeller of constant pitch, secured to a bevel pinion 42, cooperating with two bevel pinions 8 secured to the blades 10 of the main propeller, said blades being rotatable about supporting arms 1; pinions 8 are held on a hub or casing 1ª keyed to the driving shaft 60. The torque of the propeller 45 is counterbalanced by a spring 23, which presses with the proper force and in the proper direction upon two rollers 24, mounted upon supports 26, secured to pinions 8.

Figure 5:
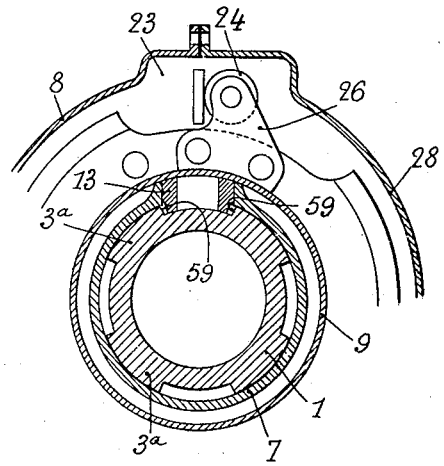
Fig. 5 is a cross section on the line 5—5 of Fig. 2.

In a preferred embodiment of the invention and as shown in the drawings, hub 1ª has a transverse bore opening into an axial recess in arms 1 and adapted to fit upon said driving shaft 60 fastened therein by a key 2. A cylindrical thrust member 7 (Figs. 2 and 5), provided with a packing ring 70 and a nut 63, is mounted on arm 1 by means of grooved sectors 3 which are formed only upon portions of said thrust member and engage corresponding grooved sectors 3ª of arm 1; the disposition is such that, in a given angular position, said thrust member may may be slidden on arm 1 and, upon rotation of said member through a suitable angle, the grooved portions 3 and 3ª engage one another, thus locking said thrust member 7 in the axial position. Said thrust member is provided with a shoulder 7ª which serves to support on one side pinion 8, secured to said shoulder by any suitable means such as bolts 22, and on the other side a flanged part 9ª of a cylindrical sleeve 9. Bolts 22 are also adapted to hold upon said shoulder two plates 26 and 26ª, supporting the pivot pins 25 of rollers 24, plate 26 being centered on sleeve 9 and plate 26ª upon thrust member 7. Rollers 24 are caused to bear in the proper direction upon the ends of spring 23. Thrust member 7 is recessed (Fig. 5) for the insertion of a sleeve-shaped stop member 13, located between the grooves of arm 1, thus limiting the displacements of pinion 8 by its contact with shoulders 59, formed on arm 1, a certain play being provided. A casing 28 encloses the several parts, and leakage of oil is prevented by a stuffing-box 36.

Between sleeve 9 and an inner tube 11, which is mounted on a ball bearing 12 disposed on arm 1, is riveted the central cylindrical part 10ª of the corresponding blade 10 of the variable-pitch propeller, which blade may consist of a hollow sheet metal member (Fig. 3). A spacing member 14 is interposed between the ball bearing 12 and a thrust bearing 15, comprising tapered rollers, cooperating with the thrust member 7. A disk 32 in contact with said ball bearing 12, supports a packing member 18 which is held by a ring 19, pressed by a nut 20 cooperating with a lock nut 58 and a pin 21. A wooden tube 16, hooped at each end at 17 surrounds member 14 and restricts the space offered to the lubricating oil, which is supplied through an oiler 30 closed by a screw plug 27, provided with a packing ring 31. Plug 37 is locked in place by a braking or locking member 57.

Arm 1 is extended beyond lock nut 58 by a reduced portion 62 whose end extends through a bearing 33, riveted to the inner wall of the blade 10 at 33ª. The connection between arm 1 and bearing 33 is made elastic by an india rubber ring 34, held in compressed condition by a ring 35 having a tapered fit in bearing 33.

The auxiliary propeller is mounted in the following manner: A portion 50 of the hub 1ª forms a support for two ball bearings 40—41.

On said support is a shoulder 51 engaging ball bearing 40; a spacing member 52 is interposed between said bearing and ball bearing 41, which is held by a pinned nut 49. A toothed ring 42 is mounted on and centered by said ball bearings 40—41, and is held by a shoulder 53 and an inner nut 48; it is formed with flutes 42ª cooperating with flutes of the hub 43 of said constant-pitch propeller 45 for driving the latter. Said propeller is secured to the hub 43 by a plate 46 and bolts 55. Lateral motion of said hub is prevented by a tapered ring 54, secured by a nut 47. A cover 56 is secured to plate 46 by screws 56ª.

The extension 62 of arm 1 serves as a rigid support for the propeller blade, thus avoiding deformation of the latter.

The elastic connection 33—34—35 also prevents the deformation of the blades, and it tends to reduce the vibrations of said blades when rotating. The thrust bearing 15 and the grooves 3 of the thrust member support all centrifugal stress exercised upon the blades 10.

Obviously, the invention is not strictly limited to the constructional details herein described and represented, which are given solely by way of example.

Having now described my invention what I claim as new and desire to secure by Letters Patent is:

A propeller unit comprising in combination a propeller shaft, a main propeller frame keyed to said shaft, propeller blades pivotally mounted on said frame, means for automatically pivoting said blades upon said frame in flight, said frame comprising radial arms extending longitudinally through said blades towards the ends thereof and elastic connections remote from said shaft, between said blades and the outer ends of said arms for both allowing the rotation of said blades about said arms and for damping vibrations of said blades.

MARIUS JEAN-BAPTISTE BARBAROU.